(12) United States Patent
Liu et al.

(10) Patent No.: US 10,384,955 B1
(45) Date of Patent: Aug. 20, 2019

(54) SEWAGE TREATMENT SYSTEM

(71) Applicant: Xiaojun Liu, Shenzhen (CN)

(72) Inventors: Xiaojun Liu, Shenzhen (CN); Caixia Wang, Shenzhen (CN); Junlong Liu, Shenzhen (CN)

(73) Assignee: Xiaojun Liu, Shenzhen (CN)

( * ) Notice: Subject to any disclaimer, the term of this patent is extended or adjusted under 35 U.S.C. 154(b) by 0 days.

(21) Appl. No.: 16/124,215

(22) Filed: Sep. 7, 2018

(30) Foreign Application Priority Data

Feb. 9, 2018 (CN) .......................... 2018 1 0132204

(51) Int. Cl.
*C02F 1/00* (2006.01)

(52) U.S. Cl.
CPC ........ *C02F 1/001* (2013.01); *C02F 2201/002* (2013.01); *C02F 2209/02* (2013.01); *C02F 2209/40* (2013.01)

(58) Field of Classification Search
None
See application file for complete search history.

(56) References Cited

U.S. PATENT DOCUMENTS 4,100,070 A * 7/1978 White .................. C02F 3/1215
210/136

* cited by examiner

*Primary Examiner* — Chester T Barry

(57) ABSTRACT

A sewage treatment system includes a main box and a can-type filter arranged on a side of the main box. A power source, a controller, a data memory, a temperature and humidity sensor, a wireless communication transmission unit, a BLUETOOTH transmission unit and an alertor are arranged inside the main box. The data memory, the temperature and humidity sensor, the wireless communication transmission unit, the BLUETOOTH transmission unit, and the alertor are electrically connected with the controller. The main box is externally connected with a conveying pipeline to convey the sewage into an interior of the main box. A primary filter, a secondary filter and a tertiary filter are sequentially arranged in an interior of the main box from top to bottom.

5 Claims, 2 Drawing Sheets

SEWAGE TREATMENT SYSTEM

BACKGROUND OF INVENTION

1. Field of Invention

The present disclosure relates to the field of sewage treatment system technology, and more particularly to a sewage treatment system capable of improving efficiency of sewage treatment and reducing sewage treatment cost.

2. Description of Prior Art

In the field of sewage treatment system technology, activated sludge is widely used for sewage treatment, where the activated sludge is a general term for microbial population and the organic and inorganic substances attached by the microbial population. The activated sludge is divided into aerobic activated sludge and anaerobic granular activated sludge, and the active sludge is mainly used for treating sewage, and sludge is generated in treating sewage process and needs to be discharged. Because the discharged sludge contains a large amount of organic matter, ammonia nitrogen, phosphorus, heavy metals and so on, and the moisture content in the discharged sludge is high, thus, the discharged sludge only can be incinerated or landfilled. The above treatment methods are costly, inconvenient to store and transport sludge, and easily cause soil and water pollution. The above problem should be solved in sewage treatment systems.

SUMMARY OF INVENTION

In order to overcome the problems existing in the prior art, the present disclosure provides a sewage treatment system capable of effectively improving efficiency of the sewage treatment and reducing sewage treatment cost.

Compared with the prior art, the present disclosure of the novel efficient sewage treatment system comprises a main box and a can-type filter disposed on a side of the main box. A power source, a controller, a data memory, a temperature and humidity sensor, a wireless communication transmission unit, a BLUETOOTH transmission unit and an alertor are arranged inside the main box. A primary filter, a secondary filter and a tertiary filter are sequentially arranged in an interior of the main box from top to bottom. A first reflux pipe and a second reflux pipe are arranged in an exterior of the main box. The first reflux pipe returns sewage in the secondary filter to the primary filter and the second reflux pipe returns sewage in the tertiary filter to the primary filter. For all practical purposes, because of setting the reflux pipe, the sewage that does not meet the filtration requirements is reflowed and filtered to ensure good filtration effect. Structure of the present disclosure is reasonable in design and good in use, and is suitable for wide-scale promotion.

DETAILED DESCRIPTION OF PREFERRED EMBODIMENTS

To make the objectives, technical solution and merits thereof more apparent, with reference to the drawings and embodiments, the present disclosure is further described in detail. It should be understood that the embodiments described here are only used to explain the present disclosure and are not intended to limit the present disclosure.

Figure 1:
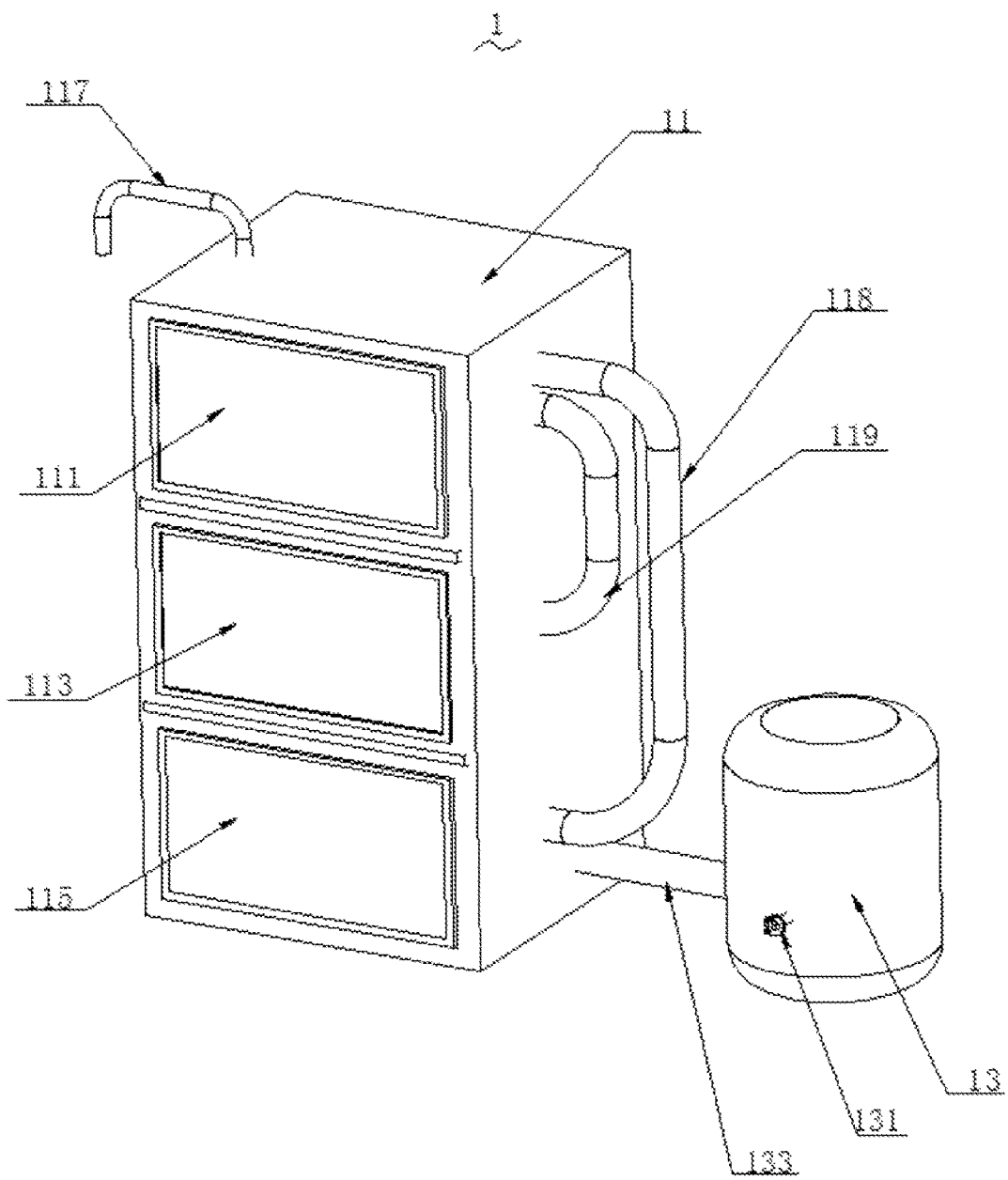
FIG. 1 is a perspective view showing a structural diagram of a sewage treatment system of the present disclosure.
Figure 2:
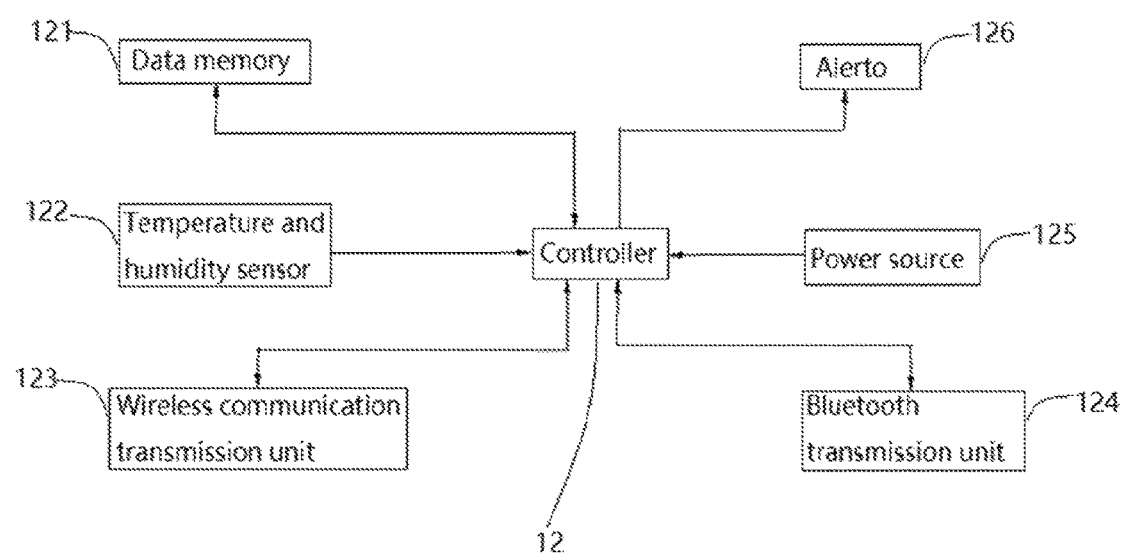
FIG. 2 is a schematic diagram of functional components of a main box of a sewage treatment system of the present disclosure.

As shown in FIG. 1 and FIG. 2, the present disclosure provides a sewage treatment system 1 comprises a main box 11 and a can-type filter 13 arranged on a side of the main box 11. A power source 125, a controller 12, a data memory 121, a temperature and humidity sensor 122, a wireless communication transmission unit 123, a BLUETOOTH transmission unit 124 and an alertor 126 are arranged inside the main box 11. The data memory 121, the temperature and humidity sensor 122, the wireless communication transmission unit 123, the BLUETOOTH transmission unit 124, and the alertor 126 are electrically connected with the controller 12. The main box 11 is externally connected with a conveying pipeline 117 to convey the sewage into an interior of the main box 11. A primary filter 111, a secondary filter 113 and a tertiary filter 115 are sequentially arranged in the interior of the main box 11 from top to bottom. A first reflux pipe 119 and a second reflux pipe 118 are arranged in an exterior of the main box 11. The first reflux pipe 119 is used to return the sewage in the secondary filter 113 to the primary filter 111 and the second reflux pipe 118 is used to return the sewage in the tertiary filter 115 to the primary filter 111. A diameter of the first reflux pipe 119 ranges from 7 cm to 12 cm, and a diameter of the second reflux pipe 119 ranges from 8 cm to 11 cm. A quartz sand filter plate, an anthracite filter plate, and an activated carbon filter plate are arranged in the primary filter 111, and thickness of the quartz sand filter plate, the anthracite filter plate, and the activated carbon filter plate sequentially reduce. The thickness of the quartz sand filter plate ranges from 8.3 cm to 6.7 cm; the thickness of the anthracite filter plate ranges from 6.6 cm to 6.8 cm; and the thickness of the activated carbon filter plate ranges from 5.6 cm to 6.4 cm. A fiber filter plate, a polyvinyl chloride (PVC) filter plate, and a cationic resin exchange filter plate are arranged in the secondary filter 113. The thickness of the fiber filter plate, the PVC filter plate, and the cationic resin exchange filter plate sequentially increase. The thickness of the fiber filter plate ranges from 3.3 cm to 3.7 cm. The thickness of the PVC filter plate ranges from 4.3 cm to 4.7 cm. The thickness of the cationic resin exchange filter plate ranges from 4.9 cm to 5.5 cm. A polytetrafluoroethylene filter plate, a deodorizing plate, and a sponge filter plate are arranged in the tertiary filter 115. The thickness of the polytetrafluoroethylene filter plate, the deodorizing plate and the sponge filter plate sequentially reduce. The thickness of the polytetrafluoroethylene filter plate ranges from 6.9 cm to 7.3 cm. The thickness of the deodorizing plate ranges from 5.3 cm to 5.7 cm. The thickness of the sponge filter plate ranges from 4.3 cm to 4.6 cm. The main box 11 is connected with the can-type filter 13 through an intermediate pipe 133; and a diameter of the intermediate pipe 133 ranges from 5.6 cm to 9 cm. A rotating shaft and a plurality of layers of filter plates connected to the rotating shaft are arranged inside the can-type filter 13. The can-type filter 13 further comprises a rotary drive motor for driving the rotation of the rotating shaft. The plurality of layers of filter plate comprises a vermiculite filter plate, a bio-black carbon filter plate and a calcium carbonate filter plate layer. Thickness of the vermiculite filter plate, the bio-black carbon filter plate and the calcium carbonate filter plate layer range from 7.4 cm to 8.3 cm. A faucet 131 is further connected with an exterior of the can-type filter 13, and a flow sensor is arranged on an exterior of the faucet 131. The rotary drive motor and the flow sensor are electrically connected with the controller. A touch display screen and a plurality of control buttons are arranged on a front side of the main box 11. A high-definition infrared camera is arranged on a top of the main box. The touch display screen, the control buttons, and the high-definition infrared camera are electrically connected with the controller.

The present disclosure of the sewage treatment system 1 comprises the main box 11 and the can-type filter 13 arranged on the side of the main box 11. The power source, the controller, the data memory, the temperature and humidity sensor, the wireless communication transmission unit, the BLUETOOTH transmission unit, and the alertor are arranged inside the main box 11. The primary filter 111, the secondary filter 113 and the tertiary filter 115 are sequentially arranged in the interior of the main box 11 from top to bottom. The first reflux pipe 119 and the second reflux pipe 118 are arranged in an exterior of the main box 11. The first reflux pipe 119 is used to return the sewage in the secondary filter 113 to the primary filter 111 and the second reflux pipe 118 is used to return the sewage in the tertiary filter 115 to the primary filter 111. For all practical purposes, because of setting the reflux pipe, the sewage that does not meet the filtration requirements is reflowed and filtered to ensure good filtration effect. Structure of the present disclosure is reasonable in design and good in use, and is suitable for wide-scale promotion.

Furthermore, a water quality sensor electrically connected to the controller is arranged on an interior of the can-type filter 13.

Furthermore, the can-type filter 13 is cylindrical in shape, and an outer diameter of the can-type filter 13 ranges from 75 to 160 cm.

Furthermore, an access door is arranged on an external of any one of the primary filter 111, the secondary filter 113 and the tertiary filter 115.

Furthermore, the touch display screen is a capacitive touch display screen.

Compared with the prior art, the present disclosure of the sewage treatment system 1 comprises the main box 11 and the can-type filter 13 arranged on the side of the main box 11. The power source 125, the controller 12, the data memory 121, the temperature and humidity sensor 122, the wireless communication transmission unit 123, the BLUETOOTH transmission unit 124, and the alertor 126 are disposed arranged the main box 11. The primary filter 111, the secondary filter 113, and the tertiary filter 115 are sequentially arranged in the interior of the main box 11 from top to bottom. The first reflux pipe 119 and the second reflux pipe 118 are arranged in an exterior of the main box 11. The first reflux pipe 119 is used to return the sewage in the secondary filter 113 to the primary filter 111 and the second reflux pipe 118 is used to return the sewage in the tertiary filter 115 to the primary filter 111. For all practical purposes, because of setting the reflux pipe, the sewage that does not meet the filtration requirements is reflowed and filtered to ensure good filtration effect. Structure of the present disclosure is reasonable in design and good in use, and is suitable for wide-scale promotion.

The above-described embodiments of the present disclosure are not to be construed as limiting the scope of the present disclosure. Any of the modifications, equivalent replacement, and improvement within the spirit and principle of the present disclosure should fall within the protection scope of the claims.

What is claimed is:
1. A sewage treatment system, comprising
    a main box; and
    a canister filter arranged on a side of the main box;
    wherein a power source, a controller, a data memory, a temperature and humidity sensor, a wireless communication transmission unit, a BLUETOOTH transmission unit and an alarm are arranged inside the main box; the data memory, the temperature and humidity sensor, the wireless communication transmission unit, the BLUETOOTH transmission unit, and the alarm are electrically connected with the controller; the main box is externally connected with a conveying pipeline to convey the sewage into an interior of the main box; a primary filter, a secondary filter and a tertiary filter are sequentially arranged in the interior of the main box from top to bottom;
    wherein a first reflux pipe and a second reflux pipe are arranged in an exterior of the main box; the first reflux pipe returns sewage in the secondary filter to the primary filter and the second reflux pipe returns sewage in the tertiary filter to the primary filter; a diameter of the first reflux pipe ranges from 7 cm to 12 cm; a diameter of the second reflux pipe ranges from 8 cm to 11 cm; a quartz sand filter plate, an anthracite filter plate and an activated carbon filter plate are arranged in the primary filter; thickness of the quartz sand filter plate, the anthracite filter plate, and the activated carbon filter plate sequentially reduce; the thickness of the quartz sand filter plate ranges from 8.3 cm to 6.7 cm; the thickness of the anthracite filter plate ranges from 6.6 cm to 6.8 cm; the thickness of the activated carbon filter plate ranges from 5.6 cm to 6.4 cm;
    wherein a fiber filter plate, a polyvinyl chloride (PVC) filter plate, and a cationic resin exchange filter plate are arranged in the secondary filter, thickness of the fiber filter plate, the PVC filter plate, and the cationic resin exchange filter plate sequentially increase; the thickness of the fiber filter plate ranges from 3.3 cm to 3.7 cm; the thickness of the PVC filter plate ranges from 4.3 cm to 4.7 cm; the thickness of the cationic resin exchange filter plate ranges from 4.9 cm to 5.5 cm; a polytetrafluoroethylene filter plate, a deodorizing plate, and a sponge filter plate are arranged in the tertiary filter; and the thickness of the polytetrafluoroethylene filter plate, the deodorizing plate, and the sponge filter plate sequentially reduce; the thickness of the polytetrafluoroethylene filter plate ranges from 6.9 cm to 7.3 cm; the thickness of the deodorizing plate ranges from 5.3 cm to 5.7 cm; the thickness of the sponge filter plate ranges from 4.3 cm to 4.6 cm;
    wherein the main box is connected with the canister filter through an intermediate pipe; and a diameter of the intermediate pipe ranges from 5.6 cm to 9 cm; a rotating shaft and a plurality of layers of filter plates connected to the rotating shaft are arranged inside the canister filter; the canister filter further comprises a rotary drive motor for driving the rotation of the rotating shaft; the plurality of layers of filter plate comprises a vermiculite filter plate, a bio-black carbon filter plate and a calcium carbonate filter plate layer; the thicknesses of the vermiculite filter plate, the bio-black carbon filter plate and the calcium carbonate filter plate layer range from 7.4 cm to 8.3 cm; a faucet is further connected with an exterior of the canister filter; a flow sensor is arranged on an exterior of the faucet; the controller is electrically connected with the rotary drive motor and the flow sensor; a touch display screen and a plurality of control buttons are arranged on a front side of the main box; a high-definition infrared camera is arranged on a top of the main box; and the touch display screen, the control buttons, and the high-definition infrared camera are electrically connected with the controller.

2. The sewage treatment system according to claim 1, wherein a water quality sensor electrically connected to the controller is arranged on an interior of the canister filter.

3. The sewage treatment system according to claim 2, wherein the canister filter is cylindrical in shape, and an outer diameter of the canister filter ranges from 75 to 160 cm.

4. The sewage treatment system according to claim 1, wherein an access door is arranged on an external surface of any one of the primary filter, the secondary filter and the tertiary filter.

5. The sewage treatment system according to claim 1, wherein the touch display screen is a capacitive touch display screen.

\* \* \* \* \*